United States Patent
Luo et al.

(10) Patent No.: US 7,216,927 B2
(45) Date of Patent: May 15, 2007

(54) LIGHTWEIGHT HYBRID TUBULAR/CASTING INSTRUMENT PANEL BEAM

(75) Inventors: Aihua A. Luo, Troy, MI (US); Anil K. Sachdev, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 41 days.

(21) Appl. No.: 11/061,132

(22) Filed: Feb. 18, 2005

(65) Prior Publication Data
US 2006/0119139 A1 Jun. 8, 2006

Related U.S. Application Data

(60) Provisional application No. 60/632,760, filed on Dec. 3, 2004.

(51) Int. Cl.
*B60J 7/00* (2006.01)
(52) U.S. Cl. .................... 296/193.02; 296/70
(58) Field of Classification Search .......... 296/193.02, 296/70; 280/779
See application file for complete search history.

(56) References Cited

U.S. PATENT DOCUMENTS

| | | | | |
|---|---|---|---|---|
| 5,238,286 A | * | 8/1993 | Tanaka et al. | 296/193.02 |
| 5,387,023 A | * | 2/1995 | Deneau | 296/193.02 |
| 5,934,733 A | * | 8/1999 | Manwaring | 296/72 |
| 6,092,840 A | * | 7/2000 | Sugawara | 280/779 |
| 6,276,740 B1 | * | 8/2001 | Mellor et al. | 296/72 |
| 6,422,633 B2 | * | 7/2002 | Neuss et al. | 296/193.02 |
| 6,447,041 B1 | * | 9/2002 | Vandersluis et al. | 296/70 |
| 6,517,139 B2 | * | 2/2003 | Sutou et al. | 296/70 |
| 6,523,878 B2 | * | 2/2003 | Scheidel | 296/70 |
| 6,554,352 B2 | * | 4/2003 | Nagy | 296/70 |
| 6,560,872 B2 | * | 5/2003 | Morrison et al. | 29/897.2 |
| 6,793,246 B2 | * | 9/2004 | Horsch | 280/751 |
| 6,877,787 B2 | * | 4/2005 | Ito et al. | 296/70 |
| 6,921,128 B2 | * | 7/2005 | Davis et al. | 296/193.02 |
| 6,932,410 B2 | * | 8/2005 | DeLong et al. | 296/70 |
| 2004/0135400 A1 | * | 7/2004 | Matsuzaki et al. | 296/193.02 |
| 2005/0035585 A1 | * | 2/2005 | Lee | 280/779 |
| 2005/0275207 A1 | * | 12/2005 | Park | 280/779 |

* cited by examiner

*Primary Examiner*—Kiran B. Patel
(74) *Attorney, Agent, or Firm*—Kathryn A. Marra

(57) ABSTRACT

An instrument panel beam includes an elongated main member having a bent tubular configuration, and a plurality of structural supports connected to the member. The beam is formed of a lightweight material, such as a magnesium or aluminum alloy. The beam is preferably constructed utilizing a die-cast process, wherein at least a portion of the member is overmolded by each support so as to cooperatively form a soldered region therebetween.

5 Claims, 1 Drawing Sheet

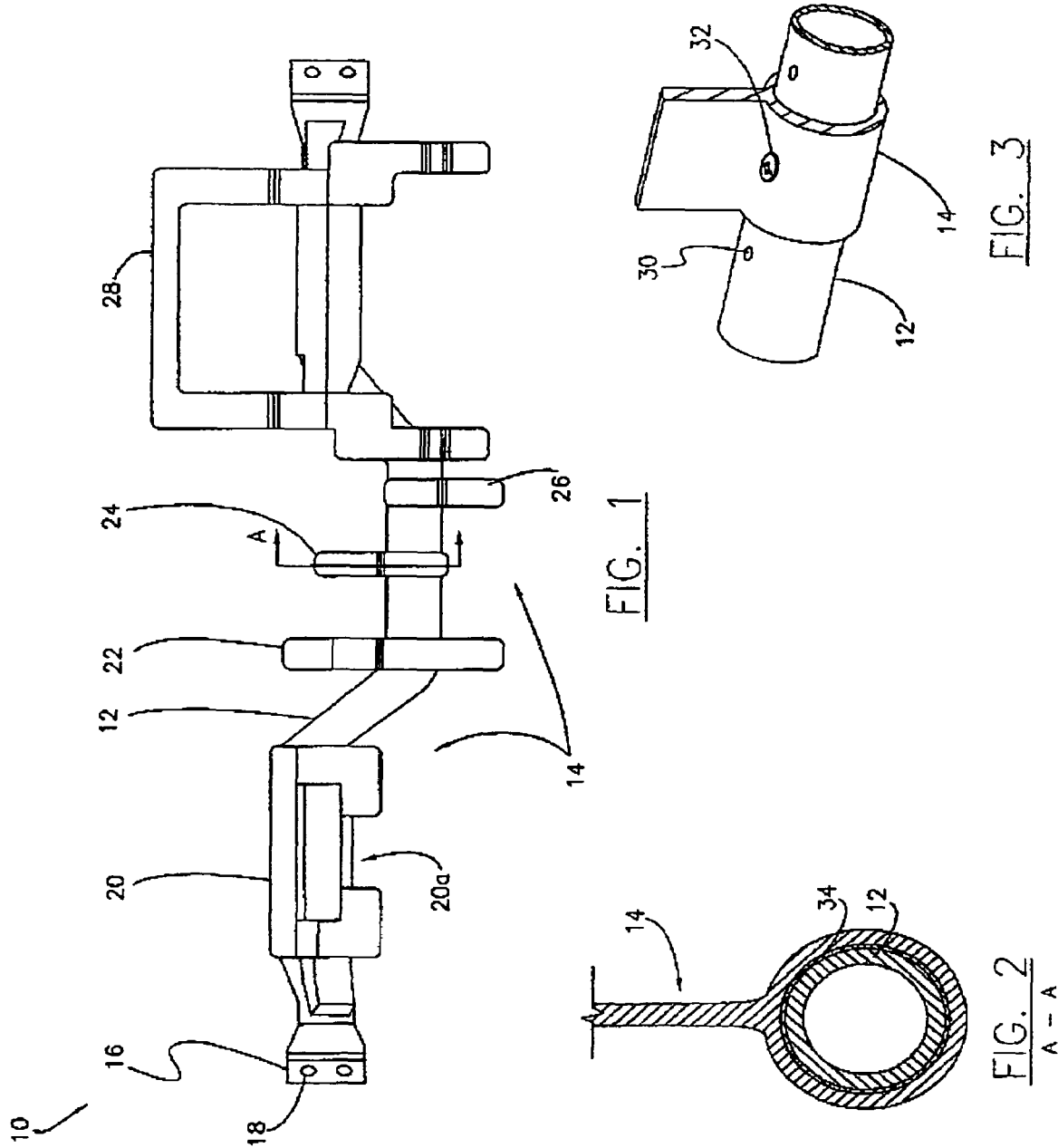

LIGHTWEIGHT HYBRID TUBULAR/CASTING INSTRUMENT PANEL BEAM

CROSS REFERENCE TO RELATED APPLICATION

This application claims priority to U.S. Provisional No. 60/632,760 filed on Dec. 3, 2004.

BACKGROUND OF THE INVENTION

1. Field of the Invention

The present invention relates to instrument panel beams, and more particularly to a lightweight hybrid tubular/casting instrument panel beam and die-cast method of making the same.

2. Discussion of Prior Art

Instrument panel beams and structures have been developed to support the instrument panels or clusters of transportation machines, such as automobiles, aircrafts, recreational vehicles, and boats. In automobiles, for example, conventional beams support components such as coolant temperature, fuel and oil pressure gauges, speedometers, odometers and audio/video/navigational equipment. They further support and frame interior compartments and appurtenances such as glove boxes, knee bolsters, HVAC conduits, air bags, and lamps. In recognition of the need for component repair and replacement, conventional beams are configured so as not to interfere with the intricate placement and removal of each part.

Despite their functionality, however, conventional beams and structures present multiple concerns to both manufacturing engineers and users. First, in order to provide the necessary structural integrity, some conventional beam configurations and material compositions present bulky rigid structures that significantly add to the transportation weight. For example, current configurations of conventional beams include a steel stamping design, wherein about twenty stamped steel parts are welded together, a steel tubular design consisting of one or two steel tubes and a few steel stamped parts, and a one-piece magnesium die casting design. Of additional concern, these configurations are often threaded into the body of the automobile or installed around other components, adding to the complexity and expense of the design and manufacturing process. The welding requirements in the first two configurations further add to the expense and complexity of manufacture.

Accordingly, there is a need in the art for an improved instrument panel beam that more efficiently supports the instruments and storage compartments of a transportation machine, by reducing the transport weight and cost of manufacture.

BRIEF SUMMARY OF THE INVENTION

Responsive to these and other concerns associated with conventional instrument panel beams, the present invention concerns an improved beam that is useful, among other things, for reducing the transport weight and cost of manufacture of the beam.

A first aspect of the present invention concerns an apparatus adapted for supporting the instrument panel and interior storage compartments of a transportation machine. The apparatus includes a main member adapted for connection to the machine and having an elongated tubular configuration, and at least one structural support fixedly positioned relative to the panel and compartments. The at least one support is overmolded to the member.

A second aspect of the present invention concerns an apparatus adapted for supporting an instrument panel and interior storage compartments of an automobile. The apparatus includes a bent tubular member adapted for removable connection to the machine, and at least one structural support overmolded to the member in a fixed position relative to the panel and compartments. The member is formed of a material selected from the group consisting essentially of magnesium, magnesium alloys, aluminum, aluminum alloys, and steel. The at least one support is formed of a material selected from the group consisting essentially of magnesium, magnesium alloys, aluminum, and aluminum alloys. The at least one support and member cooperatively presents a soldered region, so as to be integrally formed.

A third aspect of the present invention concerns an apparatus adapted for supporting an instrument panel and interior storage compartments of an automobile. The apparatus includes a bent tubular member adapted for removable connection to the machine, and at least one structural support adjustably connected to the member in one of a plurality of fixable positions. The member is formed of a material selected from the group consisting essentially of magnesium, magnesium alloys, aluminum, aluminum alloys, and steel. While, the support(s) is formed of a material selected from the group consisting essentially of magnesium, magnesium alloys, aluminum, and aluminum alloys.

A fourth aspect of the present invention concerns a method of making an apparatus adapted for supporting the instrument panel and interior storage compartments of a transportation machine, wherein at least a portion of a main member is inserted into the cavity of a die during a casting process, so that said portion is over-molded by the die cast.

It will be understood and appreciated that the present invention provides a number of advantages over the prior art, including, for example, providing an improved instrument panel beam that is lighter and easier to produce. This invention increases the fuel efficiency of transportation and the efficiency of instrument panel beam manufacture by combining the low densities of aluminum and magnesium with the design efficiency of a tubular/casting design. The present invention also provides a more flexible beam design, and the use of lightweight die cast metal having a relatively lower melting point than conventional materials makes the beam easier to recycle.

Other aspects and advantages of the present invention will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein:

FIG. 1 is a front elevational view of an instrument panel beam in accordance with a preferred embodiment of the present invention;

FIG. 2 is a cross-sectional area of the beam shown in FIG. 1; and

FIG. 3 is a fragmentary prospective view of an instrument panel beam in accordance with a second preferred embodiment of the present invention.

DETAILED DESCRIPTION OF THE INVENTION

The present invention concerns an improved instrumental panel beam 10 for supporting and/or framing the instrumental panel cluster and at least a portion of the interior storage compartments of a transportation machine (not shown). The beam 10 is described and illustrated herein with respect to an automobile, such as a car, pickup truck or sports utility vehicle; however, it is well within the ambit of the present invention to modify the beam 10 as is necessary to be utilized in other machines such as aircrafts, recreational vehicles, and boats.

Turning first to FIG. 1, the beam 10 includes an elongated main member 12 and at least one structural support 14 retained in a fixed position relative to the machine. The preferred member 12 presents a bent configuration as is necessary to facilitate the installation and support of the center console of the panel, which typically includes the audio/video/navigational receivers and displays. The preferred member 12 is removably connectable to the machine, and more preferably, presents flat engaging sections 16 that define a plurality of fastener receiving holes 18.

As shown in FIGS. 1 and 2, except for distal sections 16, the preferred member 12 presents a tubular configuration having a circular cross-section. However, it is certainly within the ambit of the present invention for the member 12 to present other geometric cross-sectional shapes, such as square, hexagonal or elliptical cross-sections. The preferred member 12 can be an extrusion or seam-welded from sheet materials, and as such, can be integrally formed or comprise of multiple parts.

The configuration of the beam 10 is preferably predetermined using computer-aided design techniques, noting standard requirements for the location and placement of instruments and controls. For example, requirements include placing controls within the reach of an operator confined by standard attachments/devices. Once properly designed, the member 12 and supports 14 can be integrally formed, or fixably attached to one another as shown in FIG. 1. To that end, a suitable die-cast method of formation is further described herein.

In the illustrated embodiment shown in FIG. 1, the beam 10 includes a plurality of five supports 20–28 fixedly attached to the member 12. The supports 20–28 range in size and configuration based on their interconnection and function. For example, the bottom of support 20 is positioned relatively higher than the other supports and defines a cutout notch 20a in order to accommodate the driver and steering wheel. Supports 22–26 present generally rectangular and vertically oriented structures. The extensions of supports 22 and 26 above and below the member 12 are spaced to accommodate the center console instruments. Finally, support 28 presents a larger structure, including a rectangularly shaped above member expansion that is configured to support and frame a glove box, and two lower member expansions that support a passenger side knee bolster.

Alternatively, where adjustability is desired, a plurality of supports 14 can be removably connected to the member 12 in one of a plurality of fixable positions. As shown in FIG. 3, each position is defined by a fastener receiving hole 30 that is configured to receive a removable support fastener 32, such as a standard bolt or screw. The preferred supports 14 are each configured to slidably receive the member 12 and to overlay at least the bottom quandrant of the member 12, so as to primarily carry vertical loads along the structure of the support and not the fasteners 32. More preferably, the supports 14 present circular sleeve sections having an inside diameter slightly larger than the outside diameter of the member 12.

The material composition of the beam 10 predominantly includes a lightweight, heat resistant material, and more preferably consists exclusively of lightweight die-cast metal. Most preferably, the member 12 and supports 14 are formed of a material selected from the group consisting of magnesium, magnesium alloys, aluminum, aluminum alloys, and steel. It is appreciated by those ordinarily skilled in the art that this material composition and configuration yields a reduction in weight, compared to conventional beams having equivalent stiffness and functionality, within an approximate range of 30% to 55%.

Alternatively, other suitable materials, equivalent materials (wherein equivalent materials are those materials having a densisty approximately equal to or less than the density of light-weight die-cast metals and comparable shear, compressive and tensile strengths and stability), or a combination of such materials and stronger reinforcing materials can be utilized in the construction of the beam 10. For example, structural supports 14 can be formed utilizing a thermoplastic process and may comprise of a conventional polycarbonate/ABS blend, and may include steel plating for shear reinforcement. However, the cost of materials is another important design consideration. For instance, the relatively greater strength of metals generally allows thinner walls and sections and consequently requires less material than comparable plastic components.

A method of making the beam 10 includes inserting at least a portion of the beam 10 within the die cavity of a die-cast die (not shown) during a casting process, so that the at least portion of the beam is overmolded by the formation of the die cast. More preferably, where the light-weight metal is magnesium or a magnesium alloy, casting is performed utilizing a hot chamber process, and where the metal is aluminum or an aluminum alloy, a cold chamber process. Where the beam 10 includes a plurality of separate supports 14, as illustrated in FIG. 1, and so as not to subject the member 12 to multiple heating and cooling cycles, the member 12 is preferably inserted in a die having an equal plurality of cavities. For example, a die having a set of cavities corresponding to the configuration of a particular make and model of an automobile can be molded and used repeatedly to produce a desired beam 10. But, the overmolding can be conducted one or a few at a time using different dies if necessary or if only low clamping force die casting machines are available. Finally, a multiple cavity die having a plurality of identical or dissimilar cavities or sets of cavities can be utilized, so that a plurality of identical or dissimilar beams could be formed concurrently.

Although described with respect to a die-casting process, it is certainly within the ambit of the present invention to utilize other methods of formation, such as injection molding, to overmold the member 12. It is appreciated by those ordinarily skilled in the art, however, that the die cast process produces a soldered region 34, where materials of overlapping melting ranges are utilized (see FIG. 2). Thus, in the preferred embodiment, the bond between a member 12 and a support 14 formed of the same lightweight metal, and more preferably of a Magnesium alloy, is stronger than the bond formed by dissimilar materials, where no soldering effect occurs.

It is further appreciated that the die cast process produces a wide array of complex parts that are durable and dimensionally stable, while maintaining close tolerances. The total systems approach and design of the beam 10 consolidates numerous conventional steel supports; and as such, the die cast beam does not consist of separate parts welded or fastened together, and the strength of the beam is that of the lightweight alloy rather than the joining process. This reduces the manufacturing cost and weight of each beam, and thereby provides significant capital savings over a repetitive cycle.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An instrument panel beam for supporting an instrument panel and one or more interior storage compartments of a vehicle comprising:

a main member that is connectable to the vehicle, said main member having an elongated bent tubular configuration; and a plurality of structural supports spaced apart and positioned along the main member, each of said structural supports being overmolded about the main member and being slideable relative to the main member, at least one of said structural supports being connected to the main member in a removable manner, said main member and structural supports being formed of a lightweight material and being cooperatively arranged to support the instrument panel and interior storage compartments when the main member is connected to the vehicle.

2. The beam as claimed in claim 1, said member being formed of a material selected from the group consisting of magnesium alloys, aluminum and aluminum alloys.

3. The beam apparatus as claimed in claim 1, said at least one support being formed of a material selected from the group consisting of magnesium alloys, aluminum, and aluminum alloys.

4. The beam apparatus as claimed in claim 1, said at least one support being formed of a thermoplastic eguivalent material.

5. The beam as claimed in claim 1, wherein the position of said at least one support relative to the member is adjustable.

* * * * *